United States Patent [19]

Akamine et al.

[11] Patent Number: 4,505,824
[45] Date of Patent: Mar. 19, 1985

[54] METHOD AND APPARATUS FOR PURIFYING LIQUID USING AN ELECTROMAGNETIC FILTER

[76] Inventors: Kazuhiko Akamine, Suwadai-ryo, 2-3, Takasuzu-cho, Hitachi-shi, Ibaraki-ken; Katsuya Ebara, 1400, Motoyoshida-cho, Mito-shi, Ibaraki-ken; Kazuyuki Ito, 6-20-3, Ayukawa-cho; Shinji Mitani, 1050-46, Moriyama-cho, both of Hitachi-shi, Ibaraki-ken, all of Japan

[21] Appl. No.: 434,852

[22] Filed: Oct. 18, 1982

[30] Foreign Application Priority Data

Nov. 2, 1981 [JP] Japan ................................ 56-174634

[51] Int. Cl.³ .......................................... B01D 35/06
[52] U.S. Cl. ................................ 210/695; 210/196; 210/223; 210/186; 376/315; 60/646; 60/657
[58] Field of Search ............... 210/222, 223, 695, 243, 210/108, 167, 774, 186, 196; 60/646, 657; 209/11, 224, 223 R; 335/300; 336/62; 376/315; 165/DIG. 12

[56] References Cited

U.S. PATENT DOCUMENTS

| | | | |
|---|---|---|---|
| 1,491,600 | 4/1924 | Fernow, Jr. | 209/224 |
| 3,279,602 | 10/1966 | Kottenstette et al. | 209/223 R |
| 3,593,242 | 7/1971 | Klein | 336/62 |
| 3,894,391 | 7/1975 | Heitmann et al. | 60/575 |
| 4,061,186 | 12/1977 | Ljung | 165/DIG. 12 |
| 4,242,200 | 12/1980 | Dubourg | 376/315 |
| 4,249,994 | 2/1981 | Dolle | 210/222 |
| 4,353,213 | 10/1982 | Masuda et al. | 60/646 |

Primary Examiner—Richard V. Fisher
Assistant Examiner—John W. Czaja
Attorney, Agent, or Firm—Antonelli, Terry & Wands

[57] ABSTRACT

A method of and apparatus for purifying a liquid which contains magnetic solid particles therein, includes a system for feeding the liquid to a container of an electromagnetic filter including a matrix disposed inside the container and a coil disposed so as to encompass the outer circumference of the container and generating a line of magnetic force to magnetize the matrix when a current is applied thereto. The coil is cooled by diverting the purified liquid from a downstream side of the matrix.

16 Claims, 8 Drawing Figures

METHOD AND APPARATUS FOR PURIFYING LIQUID USING AN ELECTROMAGNETIC FILTER

BACKGROUND OF THE INVENTION

This invention relates to a method and apparatus for purifying a liquid. More particularly, the present invention relates to a method and apparatus suitable for simplifying the cooling equipment of an electromagnetic coil of an electromagnetic filter for separating magnetic solid particles contained in a liquid.

Proposals have been made to separate metallic particles contained in feed water to a steam generator of an atomic power plant such as the feed water to a pressure containment of a boiling water reactor power generation plant by use of an electromagnetic filter. A typical example of such proposals is illustrated in FIG. 1 of U.S. Pat. No. 3,894,391.

The electromagnetic filter has a construction in which the outer circumference of a container, into which a matrix material to be magnetized is packed, is encompassed by an electromagnetic coil. The electromagnetic coil is made of copper. When a current is caused to flow through the coil, the coil generates an induction magnetic field which magnetizes the matrix material. The coil includes therein a passage for causing cooling water to flow in order to eliminate heat generated when the current is fed.

As the cooling water of the electromagnetic coil, cooling water for an auxiliary machinery cooling system of the boiling water reactor power generation plant is used. Since the quantity of the cooling water is extremely large (approximately 17 m$^3$/hr for a boiling water reactor power generation plant of a 1,100 MWe class), however, the capacity of the auxiliary machinery cooling system increases remarkably, thus resulting in the remarkable increase in the size of the auxiliary machinery cooling system and eventually, in the increase in the size of the boiling water reactor power generation plant as a whole. In the auxiliary machinery cooling system, the cooling water for cooling the auxiliary machinery is cooled by a heat-exchanger using cooling water flowing through a closed loop as another circulation system and the cooling water inside the closed loop is in turn cooled by brine via another heat-exchanger.

SUMMARY OF THE INVENTION

The present invention is directed to simplify the construction of the cooling system for the electromagnetic coil.

The characterizing feature of the present invention resides in that a liquid to be treated flowing through a container, into which the matrix of the electromagnetic filter is packed, is used for cooling the electromagnetic coil disposed in the electromagnetic filter. Here, the term "liquid to be treated" means those kinds of liquids in which solid particles contained therein are not yet separated, are being separated or are already separated.

DESCRIPTION OF THE PREFERRED EMBODIMENTS

Figure 1:
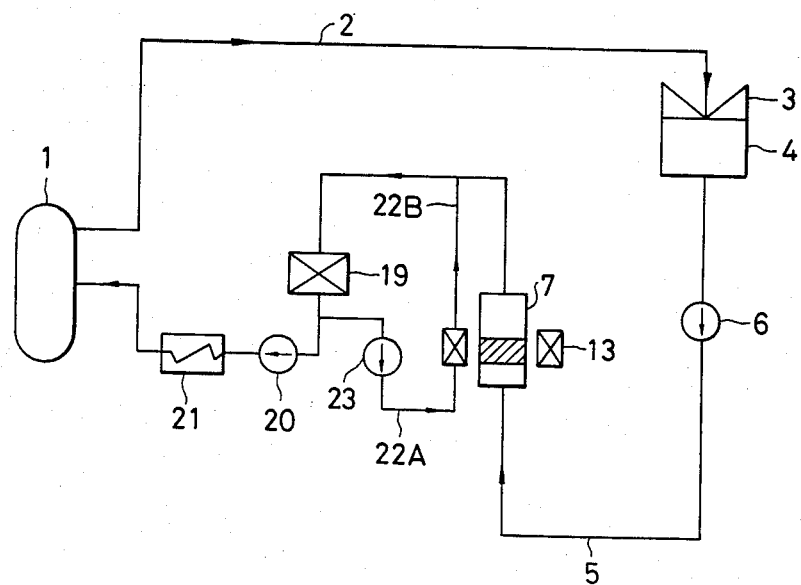
FIG. 1 is a block diagram of the boiling water reactor power generation plant to which the liquid purification apparatus in accordance with one embodiment is applied.

A preferred embodiment of the present invention applied to a boiling water reactor power generation plant will be now described with reference to FIG. 1.

The cooling water flows through the core (in which a plurality of fuel assemblies are disposed) inside a pressure containment of the reactor. During the passage through the core, the cooling water is heated and turned into steam. Hence, the pressure containment of the reactor of the boiling water reactor power generation plant is a kind of steam generator. The steam thus produced is discharged from the pressure containment 1 and is transferred to a turbine 3 through a main steam pipe 2. After discharged from the turbine 3, the steam is condensed by a condenser 4. The condensate is returned to the pressure containment 1 of the reactor as the feed water through a feed water piping arrangement 5. This process will be described in further detail. The condensate inside the condenser 4, or the cooling water, is sent into a condensation pump 6, where its pressure is raised. The cooling water then passes through an electromagnetic filter 7 and a desalting machine 19. After the pressure is elevated by a feed water pump 20, the cooling water is heated by the steam extracted by a feed water heater 21 from the turbine 3 and is fed to the pressure containment 1 of the reactor. All of the condensation pump 6, electromagnetic filter 7, desalting machine 19, feed water pump 20 and feed water heater 21 are disposed in the feed water piping arrangement 5.

Figure 2:
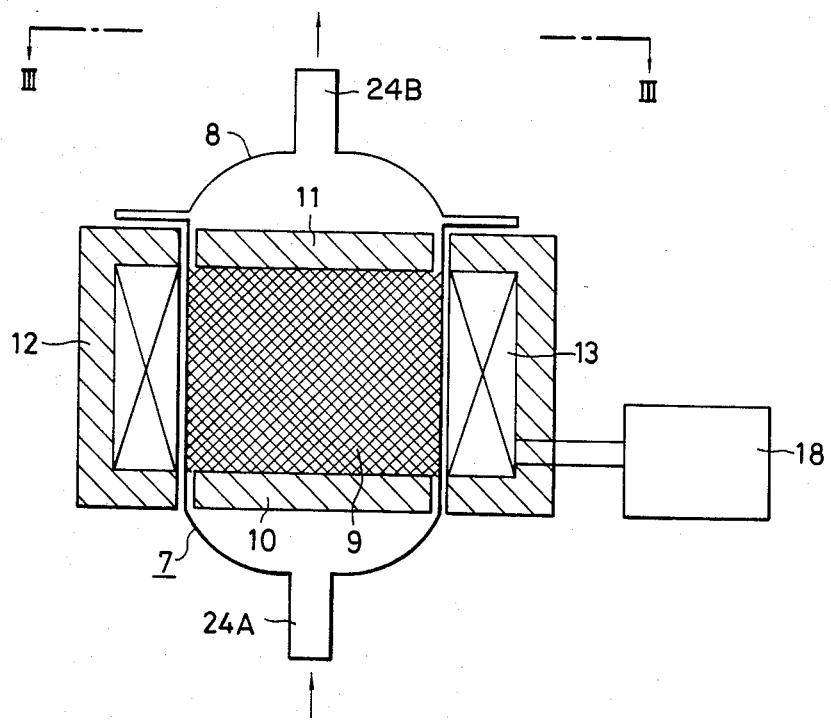
FIG. 2 is a schematic view showing the construction of the electromagnetic filter shown in FIG. 1.
Figure 3:
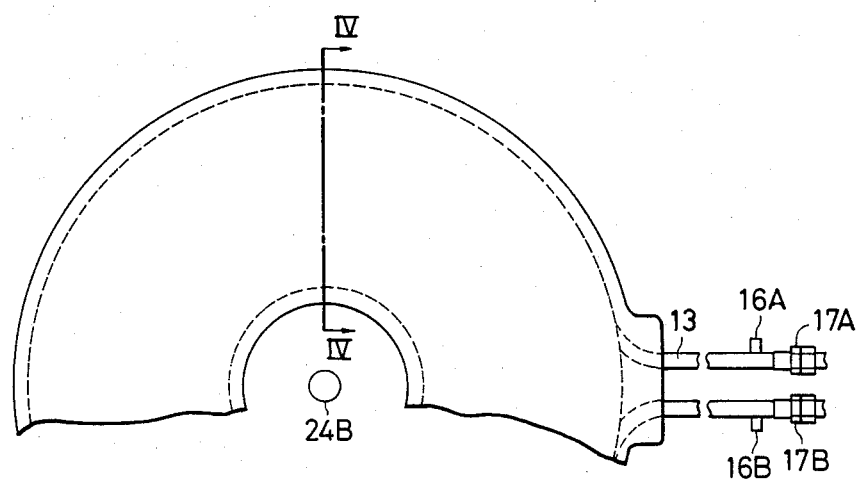
FIG. 3 is a sectional view taken along line III—III of FIG. 2.
Figure 4:
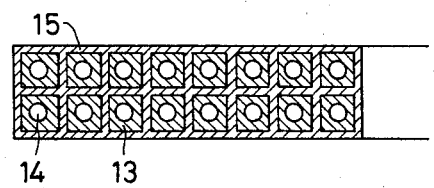
FIG. 4 is a sectional view taken along line IV—IV of FIG. 3.

The construction of the electromagnetic filter 7 will be explained with reference to FIGS. 2, 3 and 4. The electromagnetic filter 7 includes a casing 8, a matrix 9 and the electromagnetic coil 13. Cooling water inlet 24A and cooling water outlet 24B of the casing 8 are connected to the feed water piping arrangement 5. The matrix 9 which consists of a ribbonlike amorphous alloy is packed between lower and upper support plates 10 and 11, each having a large number of holes and disposed inside the casing 8. A frame 12 is fitted to the outer circumference of the casing 8. The electromagnetic coil 13 helically encompasses the outer circumference of the casing 8 and is disposed between the casing 8 and the frame 12. The electromagnetic coil 13 is made of copper and has a square cross-sectional as depicted in FIG. 4. A cooling water passage 14 is defined inside the electromagnetic coil 13. An insulating material 15 is disposed between the adjacent portions of the electromagnetic coil 13 that is arranged helically. Joints 17A and 17B are disposed at both ends of the electromagnetic coil 13 and are connected to a d.c. power source 18.

A piping arrangement 22A having a pump 23 is connected to the feed water piping arrangement 5 downstream of the desalting machine 19. The other end of the piping arrangement 22A is connected to the cooling water inlet 16A of the electromagnetic coil 13. One end of the piping arrangement 22B is connected to the cooling water outlet 16B of the electromagnetic coil 13 with the other end being connected to the feed water piping arrangement 5 between the electromagnetic filter 7 and the desalting machine 19.

The line of magnetic force to penetrate through the electromagnetic coil 13 is generated when a current is caused to flow through the coil 13, and magnetizes the matrix 9. The matrix 9 is magnetized during the operation of the boiling water reactor power generation plant. When the cooling water discharged from the condensation pump 6 is fed to the electromagnetic filter 7 under such a state, fine particles of ion oxides (hereinafter referred to as the "clad") contained in the cooling water attach to the matrix 9 and are separated from the cooling water. The clad is generated as the inner surface of the steam bleeding piping arrangement for supplying the heated steam to the feed water heater 21 and the inner surface of the feed water piping arrangement 5 upstream of the electromagnetic filter 7 are peeled by corrosion. Corrosion does not proceed on the feed water piping arrangement 5 downstream of the electromagnetic filter 7 because oxygen is introduced so as to adjust the dissolved oxygen concentration in the cooling water. When the clad flows into the pressure containment 1 of the reactor, it is rendered radiative by the neutrons inside the core, resulting in the increase in the surface dose of the equipments and piping arrangements.

After the clad is removed by the electromagnetic filter 7, the cooling water is sent to the desalting machine 19. Ion exchange resins packed into the desalting machine 19 remove anions and cations contained in the cooling water. After the most of impurities are thus removed, the cooling water is introduced into the pressure containment 1 of the reactor. Since the clad is removed by the electromagnetic filter 7, it does not attach to the ion exchange resins in the desalting machine 19 and extends the life of the resins. As the number of times of regenerating the ion exchange resins is thus decreased, the quantity of regenerated waste liquor as the radioactive waste is remarkably reduced.

A part of clean cooling water discharged from the desalting machine 19 is fed to the cooling water passage 14 inside the electromagnetic coil 13 by the operation of the pump 23 through the piping arrangement 22A and through the cooling water inlet 16A. (In an atomic power plant of a 1,100 MWe class, the flow rate of the cooling water discharged from the desalting machine 19 is approximately 6,400 m$^3$/hr while the flow rate of the cooling water inside the electromagnetic coil 13 is approximately 17 m$^3$/hr.) This cooling water flows through the cooling water passage 14 and is sent to the inlet side of the desalting machine 19 through the cooling water outlet 16B and the piping arrangement 22B. The cooling water flowing through the cooling water passage 14 cools the electromagnetic coil 13 that generates the heat by the influence of the current. The temperature of the cooling water which is about 35° C. at the outlet of the desalting machine 19, that is, at the inlet of the electromagnetic coil 13, rises to about 45° C. after passing through the electromagnetic coil 13. Even if the cooling water, whose temperature thus rises, is fed into the feed water piping arrangement 5, the temperature rise of the cooling water to be fed to the desalting machine 19 is not greater than 1° C. Hence, the ion exchange capacity of the ion exchange resins inside the desalting machine 19 is not at all impeded. As the temperature rises during the passage of the cooling water through the electromagnetic coil 13, calory corresponding to the power of about 100 to about 140 KW/hr, which would otherwise be lost as the heat loss of the electromagnetic filter (required power of 200 KW/hr in a reactor power plant of a 1,100 MWe class) can be recovered. For this reason, the power loss applied to the electromagnetic coil 13 can be reduced and be effectively utilized.

The cooling system of the electromagnetic coil can be remarkably simplified because a part of the cooling water to be fed to the pressure containment 1 of the reactor through the feed water piping arrangement 5 is used as the cooling water. The auxiliary machinery cooling system can be also made compact because the volume of the cooling water for the system is reduced.

Since the electromagnetic coil 13 is made of copper, the copper ions dissolve in the cooling water flowing through the feed water passage 14. However, these ions are removed by the desalting machine 19 and consequently, the quantity of copper carried into the pressure containment 1 hardly increases.

The radioactive substances that are slightly contained in the cooling water are also removed completely by the desalting machine 19 and hence, the electromagnetic coil 13 is hardly made radiative. Accordingly, workers are completely prevented from being exposed to the radioactivity in carrying out maintenance and inspection of the electromagnetic coil 13.

Figure 5:
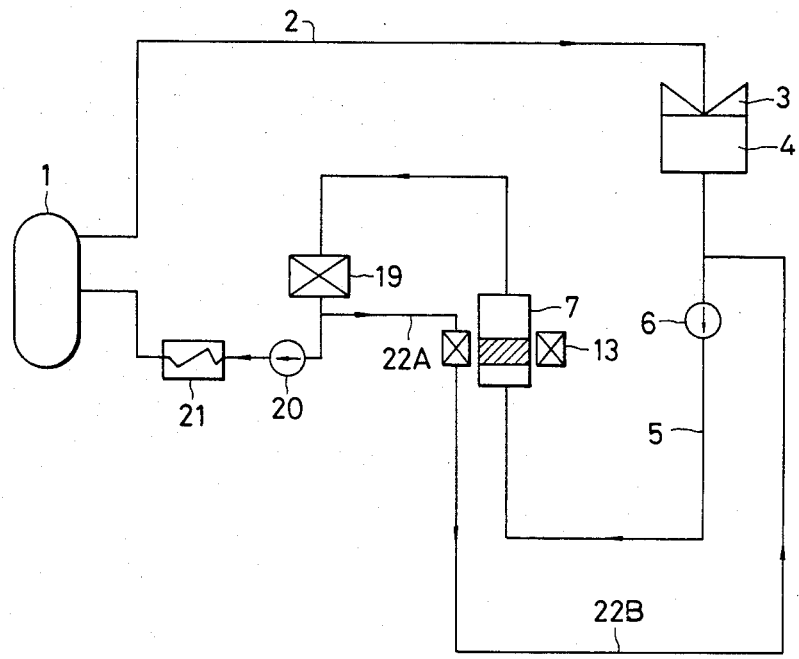
FIGS. 5 through 8 are block diagrams of the boiling water reactor power generation plants to which other embodiments of the present invention are applied.

FIG. 5 shows another embodiment of the present invention, in which like reference numerals represent like constituents as in the foregoing embodiment. This embodiment is different from the foregoing embodiment in that one end of the piping arrangement 22B is connected to the feed water piping arrangement 5 between the condenser 4 and the condensation pump 6. This embodiment provides the same effect as that of the foregoing embodiment. Moreover, since the cooling water can be fed to the electromagnetic coil 13 by use of the condensation pump 6, this embodiment eliminates the necessity of the pump 20 of the foregoing embodiment. Hence, the construction of the cooling system of the electromagnetic coil can be further simplified.

Figure 6:
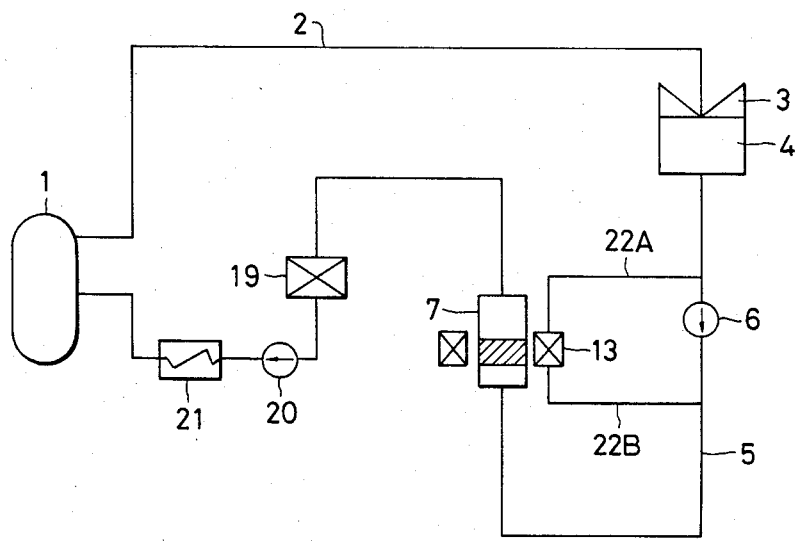

FIG. 6 shows still another embodiment of the present invention, in which like reference numerals represent like constituents as in the foregoing embodiments. In this embodiment, the piping arrangements 22A and 22B to be connected to the electromagnetic coil 13 are connected to the feed water piping arrangement 5 between the condenser 4 and the condensation pump 6 and between the condensation pump 6 and the electromagnetic filter 7. This embodiment provides the same effect as that of the embodiment shown in FIG. 5. However, since the cooling water that does not flow through the electromagnetic filter 7 and the desalting machine 19 is fed to the electromagnetic coil 13, the coil 13 is slightly contaminated by trace amounts of radioactive substances in the cooling water.

Figure 7:
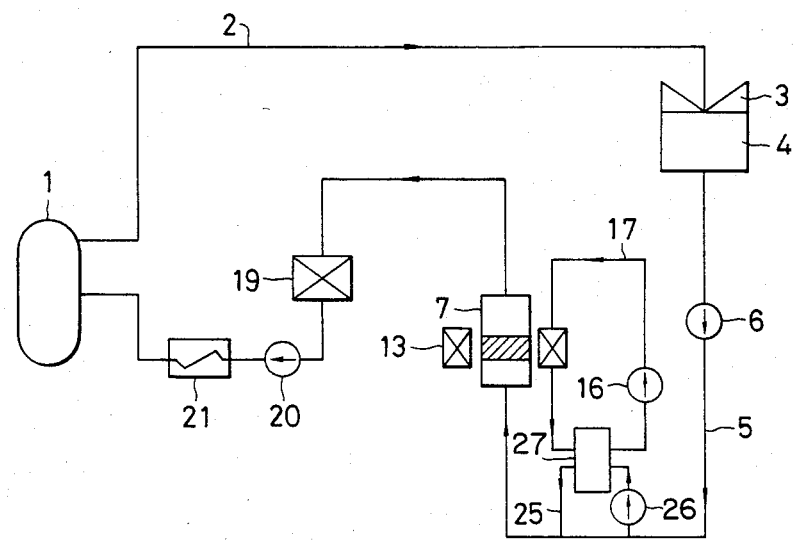

FIG. 7 shows still another embodiment of the present invention, in which like reference numerals represent like constituents as in the foregoing embodiments. In this embodiment, a circulation piping arrangement 17 whose both ends are connected to the cooling water inlets 16A and 16B of the electromagnetic coil 13 is disposed, and the heat exchanger 27 as well as the pump 16 are disposed in this circulation piping arrangement 17. A piping arrangement 25, whose both ends are connected to the feed water piping arrangement 5, is communicated with the heat exchanger 27 and the pump 26 is disposed in the piping arrangement 25.

The cooling water is charged into the circulation piping arrangement 17. When the pump 16 is actuated, the cooling water circulates through the circulation piping arrangement 17 and through the cooling water passage 14 of the electromagnetic coil 13. When the pump 26 is operated, a part of the cooling water flowing through the feed water piping arrangement 5 is led to the heat exchanger 27 through the piping arrangement 25. The cooling water discharged from the heat exchanger 27 is returned to the feed water piping arrangement 5 through the piping arrangement 25. The cooling water flowing through the circulation piping arrangement 17 is cooled by the cooling water flowing through the heat exchanger 27 and the piping arrangement 25. In this embodiment, the cooling water flowing through the electromagnetic coil 13 flows through the closed loop. Hence, the advantage that the copper ions dissolving from the electromagnetic coil 13 do not mix in the cooling water adds to the advantage of the embodiment shown in FIG. 1. The drawback of the embodiment shown in FIG. 6 can be eliminated even by use of the cooling water inside the feed water piping arrangement upstream of the electromagnetic filter 7. However, though the cooling system of the electromagnetic coil can be more simplified than the conventional apparatus, the construction of this embodiment becomes more complicated than those of the foregoing embodiments.

Figure 8:
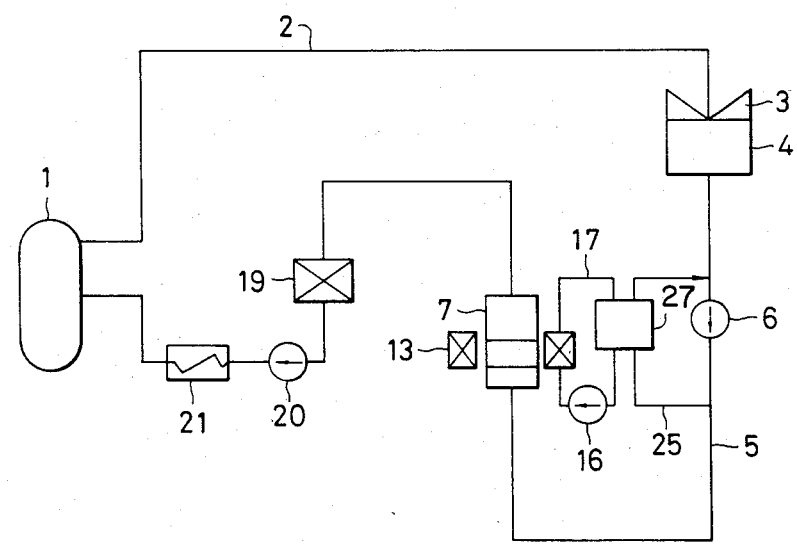

FIG. 8 shows still another embodiment of the present invention, in which like reference numerals represent like constituents as in the embodiment shown in FIG. 7. This embodiment is different from the embodiment shown in FIG. 7 in that the condensation pump 6 has also the function of the pump 26. Both ends of the piping arrangement 25 are connected to the feed water piping arrangement 5 both upstream and downstream of the condensation pump 6. This embodiment provides the same effect as that of the embodiment shown in FIG. 7 and can further simplify the construction of the cooling system of the electromagnetic coil than that of the embodiment of FIG. 7.

Though the foregoing embodiments are applied to the boiling water reactor power generation plant, they can also be applied to the feed water system of steam generation plants other than the boiling water reactor power generation plant. In other words, the present invention can be applied to the feed water system of a pressurized water reactor power generation plant or that of a fast breeder reactor power generation plant and to the feed water system of the boiler of a thermal power generation plant. When applied to these steam generating plants, the present invention can simplify the construction of the cooling system of the electromagnetic coil and can effectively use the power applied to the electromagnetic coil.

The present invention can be further applied to a radioactive waste liquor treating apparatus. That is to say, the waste liquor such as the floor drain or appliance drain waste liquor of an atomic power generation plant, which liquor is a radioactive waste liquor containing the clad, is fed to the container of the electromagnetic filter, where the clad is separated by the magnetized matrix. The floor drain or appliance drain waste liquor discharged from the container of the electromagnetic filter is fed to the desalting machine, where ionic substances containing the radioactive ions are removed. The waste liquor discharged from the desalting machine (such as the appliance drain waste liquor) is fed to the cooling waste passage defined in the electromagnetic coil of the electromagnetic filter and cools the electromagnetic coil. The waste liquor discharged from the electromagnetic coil is returned to the desalting machine described above. This embodiment provides exactly the same effect as that of the embodiment shown in FIG. 1. Especially because the waste liquor discharged from the desalting machine hardly contains any radioactive substances, the electromagnetic coil is never rendered radiative.

Furthermore, the present invention can be applied not only to the steam generating plants and radioactive waste liquor treating apparatus described above but also to the treatment of waste liquor containing iron contents such as the waste liquor of iron mills (continuous casting spray water, direct cooling water for hot rolling, dust collecting waste water of convertors and the like). The iron-containing waste liquor is fed to the electromagnetic filter and the iron content is separated by the matrix. The waste water discharged from the electromagnetic filter is used as the cooling water of the electromagnetic coil. In this case, too, the construction of the cooling system of the electromagnetic coil can be simplified. However, since the waste water is discharged outside, the power applied to the electromagnetic coil is not used effectively.

Thus, the present invention can simplify the cooling system of the electromagnetic coil of the electromagnetic filter.

What is claimed is:

1. A method of purifying a liquid containing magnetic solid particles therein, in an electromagnetic filter in a nuclear power plant which includes a nuclear reactor, a turbine, a condenser, an electromagnetic filter, a desalting unit, and a feed water heater, arranged in series, which comprises feeding said liquid to a container of said electromagnetic filter including a matrix disposed inside said container and a coil disposed so as to encompass the outer circumference of said container and generating a line of magnetic force to magnetize said matrix when a current is applied thereto, passing a cooling water, which consists of a portion of the purified reactor feed water taken from a downstream side of said desalting unit, through said coil, and then returning the cooling water to the upstream side of said electromagnetic filter.

2. A method of purifying a liquid containing magnetic solid particles in an electromagnetic filter in a nuclear power plant comprising the steps of:
   passing liquid to be treated through said electromagnetic filter to contact a matrix which is magnetized by an electromagnetic coil, thereby separating out said particles contained in said liquid; and
   diverting a portion of said liquid free of said particles from a downstream side of said electromagnetic filter to produce a cooling liquid and passing said diverted cooling liquid through said electromagnetic coil for cooling said electromagnetic coil.

3. A method of purifying a liquid according to claim 2, wherein said cooling liquid, which has been used to cool said electromagnetic coil, is returned to the upstream side of said electromagnetic filter.

4. A method of purifying a liquid according to claim 2, wherein a pump is used to pass said cooling liquid through said electromagnetic coil.

5. A method of purifying a liquid according to claim 2, wherein the temperature of said cooling liquid rises during the passage of the cooling liquid through said electromagnetic coil, whereby power loss due to said electromagnetic coil is reduced and the recovered power in the form of increased temperature of said cooling liquid can be effectively utilized.

6. A method of purifying a liquid acccording to claim 2, wherein said electromagnetic coil includes a cooling liquid inlet, a cooling liquid passage, and a cooling liquid outlet, whereby said cooling liquid enters said electromagnetic coil through said cooling liquid inlet, cools said electromagnetic coil while flowing through said cooling liquid passages, and is discharged from said electromagnetic coil through said cooling liquid outlet.

7. A method of purifying a liquid according to claim 6, wherein the temperature of said cooling liquid at said cooling liquid inlet is substantially lower than the temperature of said cooling liquid at said cooling liquid outlet.

8. A method of purifying a liquid according to claim 7, wherein the temperature of said cooling liquid at said cooling liquid inlet and outlet is approximately 35° C. and 45° C., respectively.

9. A method of purifying a liquid according to claim 2, wherein said liquid free of said particles is passed through a desalting unit before diverting a portion of said cooling liquid and passing said cooling liquid through said electromagnetic coil for cooling said electromagnetic coil.

10. A method of purifying a liquid according to claim 9, wherein said cooling liquid which has been used to cool said electromagnetic coil is returned to the upstream side of said desalting unit.

11. A method of purifying a liquid according to claim 9, wherein said desalting unit removes substantially all of the radioactive substances remaining in said purified feed water, whereby said cooling liquid which is passed through said electromagnetic coil does not cause said electromagnetic coil to become radioactive.

12. A method of purifying a liquid according to claim 9, wherein said electromagnetic coil is made of copper.

13. A method of purifying a liquid according to claim 12, wherein copper ions from said electromagnetic coil dissolve in said cooling liquid flowing through said electromagnetic coil, whereby said copper ions are removed by said desalting unit.

14. A method of purifying a liquid containing magnetic solid particles therein, in an electromagnetic filter in a nuclear power plant which includes a nuclear reactor, a turbine, a condenser, an electromagnetic filter, a desalting unit, and a feed water heater, arranged in series, which comprises feeding said liquid to a container of said electromagnetic filter including a matrix disposed inside said container and a coil disposed so as to encompass the outer circumference of said container and generating a line of magnetic force to magnetize said matrix when a current is applied thereto, passing a cooling water, which consists of a portion of the purified reactor feed water taken from a downstream side of said electromagnetic filter, through said coil, and then returning the cooling water to the upstream side of said desalting unit.

15. A method of purifying a liquid to be treated containing magnetic solid particles therein which comprises feeding said liquid to a container of an electromagnetic filter including a matrix disposed inside said container and a coil disposed so as to encompass the outer circumference of said container, generating a line of magnetic force to magnetize said matrix when a current is applied to said coil to effect removal of said magnetic solid particles, purifying liquid discharged from said container by a desalting machine and diverting a portion of the purified liquid discharged from said desalting machine to effect cooling of said coil.

16. An apparatus for purifying a liquid containing magnetic solid particles therein which comprises a container having a matrix therein and a coil encompassing the outer circumference of said container, means for applying an electric current to said coil for generating a line of magnetic force to magnetize said matrix and to effect removal of said magnetic solids from said liquid and means for feeding a portion of the resulting liquid from a downstream side of said matrix to a cooling liquid passage defined in said coil.

* * * * *